(12) United States Patent
Anderson et al.

(10) Patent No.: US 9,690,642 B2
(45) Date of Patent: Jun. 27, 2017

(54) SALVAGING EVENT TRACE INFORMATION IN POWER LOSS INTERRUPTION SCENARIOS

(71) Applicant: HGST Netherlands B.V., Amsterdam (NL)

(72) Inventors: Michael Anderson, Rochester, MN (US); Kraig Bottemiller, Rochester, MN (US); Adam Espeseth, Rochester, MN (US); Lee Sendelbach, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 248 days.

(21) Appl. No.: 13/719,209

(22) Filed: Dec. 18, 2012

(65) Prior Publication Data

US 2014/0173357 A1    Jun. 19, 2014

(51) Int. Cl.
*G06F 11/00* (2006.01)
*G06F 11/07* (2006.01)
(Continued)

(52) U.S. Cl.
CPC ...... *G06F 11/0778* (2013.01); *G06F 11/0727* (2013.01); *G06F 11/14* (2013.01);
(Continued)

(58) Field of Classification Search
CPC .............. G06F 11/0778; G06F 11/1044; G06F 11/0727; G06F 11/14; G06F 11/0763; G06F 11/1008; G06F 11/1438; G06F 11/1441
(Continued)

(56) References Cited

U.S. PATENT DOCUMENTS 6,502,208 B1 * 12/2002 McLaughlin et al. .......... 714/25
6,839,823 B1    1/2005 See et al.
(Continued)

FOREIGN PATENT DOCUMENTS

CN        103399813 A    11/2013
JP         02151913 A     6/1990
(Continued)

OTHER PUBLICATIONS

Wikipedia, "Cold boot attack", http://en.wikipedia.org/wiki/Cold_boot_attack, first downloaded on Aug. 24, 2012, 4 pp.
(Continued)

*Primary Examiner* — Bryce Bonzo
*Assistant Examiner* — India Davis
(74) *Attorney, Agent, or Firm* — John D. Henkhaus

(57) ABSTRACT

Salvaging event trace information in power loss interruption (PLI) scenarios, for use in solid-state drive (SSD) and hard disk drive (HDD) storage devices. If volatile state information that is salvaged after an inadvertent power loss were to include event trace information, then such information can provide a valuable debug resource. Event trace information from volatile memory is copied to a second memory upon a power on which is in response to a PLI event. A corrupt state of context reconstruction data stored on non-volatile memory is detected, and an indication of the corrupt state is set. The event trace information is passed to the host if requested based on the indication.

20 Claims, 2 Drawing Sheets

(51) Int. Cl.
*G06F 11/10* (2006.01)
*G06F 11/14* (2006.01)

(52) U.S. Cl.
CPC ...... *G06F 11/0763* (2013.01); *G06F 11/1008* (2013.01); *G06F 11/1438* (2013.01); *G06F 11/1441* (2013.01)

(58) Field of Classification Search
USPC .......................................................... 714/45
See application file for complete search history.

(56) References Cited

U.S. PATENT DOCUMENTS

| | | | | |
|---|---|---|---|---|
| 6,889,341 | B2* | 5/2005 | Collins | G06F 11/3055 714/22 |
| 6,988,175 | B2 | 1/2006 | Lasser | |
| 7,178,061 | B2 | 2/2007 | Aasheim et al. | |
| 7,181,672 | B2 | 2/2007 | Atri et al. | |
| 7,308,609 | B2* | 12/2007 | Dickenson | G06F 11/2268 714/15 |
| 7,424,643 | B2 | 9/2008 | Atri et al. | |
| 8,169,825 | B1 | 5/2012 | Shalvi et al. | |
| 2004/0078666 | A1* | 4/2004 | Aasheim | G06F 3/0619 714/24 |
| 2005/0138302 | A1* | 6/2005 | Lusk et al. | 711/154 |
| 2006/0156078 | A1 | 7/2006 | Baumhof et al. | |
| 2009/0222617 | A1 | 9/2009 | Yano et al. | |
| 2010/0115193 | A1* | 5/2010 | Manus et al. | 711/103 |
| 2010/0180065 | A1 | 7/2010 | Cherian et al. | |

FOREIGN PATENT DOCUMENTS

| | | |
|---|---|---|
| JP | 2008-004011 | 10/2008 |
| JP | 2009122819 A | 6/2009 |
| JP | 2010-004293 | 7/2010 |
| JP | 2012-078941 | 4/2012 |

OTHER PUBLICATIONS

Wikipedia, "Data remanence", http://en.wikipedia.org/wiki/Data_remanence, first downloaded on Aug. 24, 2012, 9 pp.
Lindahl, Michael, "Debugging with Hardware Trace Data", Reed Business Information, ECN A Supplement to ECN, www.ECNMag.com, Feb. 2005, 2 pp.
Wikipedia, "Journaling file system", http://en.wikipedia.org/wiki/Journaling_file_system, first downloaded on Aug. 24, 2012, 4 pp.
Korean Intellectual Property Office, Office Action (incl. English Translation), Dec. 22, 2014, 3 pages.
Intellectual Property Office (UK), Combined Search and Examination Report under Sections 17 and 18(3), Jun. 27, 2014, 7 pages.

* cited by examiner

SALVAGING EVENT TRACE INFORMATION IN POWER LOSS INTERRUPTION SCENARIOS

FIELD OF THE INVENTION

Embodiments of the invention relate to a fault tolerant trace tool used to debug power loss interruption (PLI) failures, for use with solid-state drives (SSD) and hard disk drives (HDD).

BACKGROUND

A solid-state drive (SSD) is a data storage device that uses integrated circuit assemblies as memory units to store data persistently. SSD technology uses electronic interfaces compatible with traditional block input/output (I/O) hard disk drives (HDDs). SSDs do not employ any moving mechanical components, which distinguishes them from traditional HDDs which store data on rotating magnetic disks using movable read-write heads.

Currently, most SSDs use NAND-based flash memory, which is a form of non-volatile memory which retains data in the absence of power and which can be electrically erased and reprogrammed (as flash memory was developed from EEPROM). Further, hybrid drives combine features of both SSDs and HDDs in the same unit, typically containing a hard disk drive and an SSD cache to improve performance of frequently accessed data. Flash memory stores information in an array of memory cells made from floating-gate transistors.

Solid state drives (SSDs) based on flash (NAND) memory are designed to be tolerant to an interruption of power and not to lose any data when experiencing such a power interruption. SSD drives generally have a non-volatile cache where data is kept, such as DRAM, and this data must be saved to the NAND memory in the event of a power loss interruption (PLI) event. Typically, an SSD contains capacitors or some other storage device with a purposefully sustained charge which provide enough power to save data to the NAND when a PLI interrupt signal is received. Data saved in response to a PLI event typically includes dirty write cache data and LBA mapping table information (e.g., indirection tables), which may include journaling data.

However, PLI problems typically require significant diagnostic efforts, which require the developer/troubleshooter to have possession of the drive in order to run tools on the drive to troubleshoot what happened during the power off sequence. Given the severity of the failure, where typically a drive may not come "ready" at poweron due to a data coherency sanity check, thus resulting in complete data loss, this long diagnostic turnaround time is not considered acceptable to customers.

SUMMARY OF EMBODIMENTS OF THE INVENTION

Embodiments of the invention are directed to salvaging event trace information in power loss interruption (PLI) scenarios, for use in solid-state drive (SSD) and hard disk drive (HDD) storage devices. If, for example, DRAM state information that is salvaged after an inadvertent power loss were to include event trace information, then such information can provide a valuable debug resource.

According to an embodiment, event trace information from volatile memory is copied to a second memory upon a power on which is in response to a PLI event. A corrupt state of context reconstruction data stored on non-volatile memory is detected, and an indication of the corrupt state is set. The event trace information may be passed to the host if requested based on the indication, according to an embodiment.

With an optional enhancement, in response to a request from a host the event trace information is passed to the host for use with a fault tolerant debug tool. The debug tool is fault tolerant in part because it is configured for inferring a legitimate trace character from a malformed trace character.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a fault tolerant trace tool used to debug power loss interruption (PLI) failures in a solid-state drive (SSD) storage device, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Solid State Drive Configuration

Figure 1:
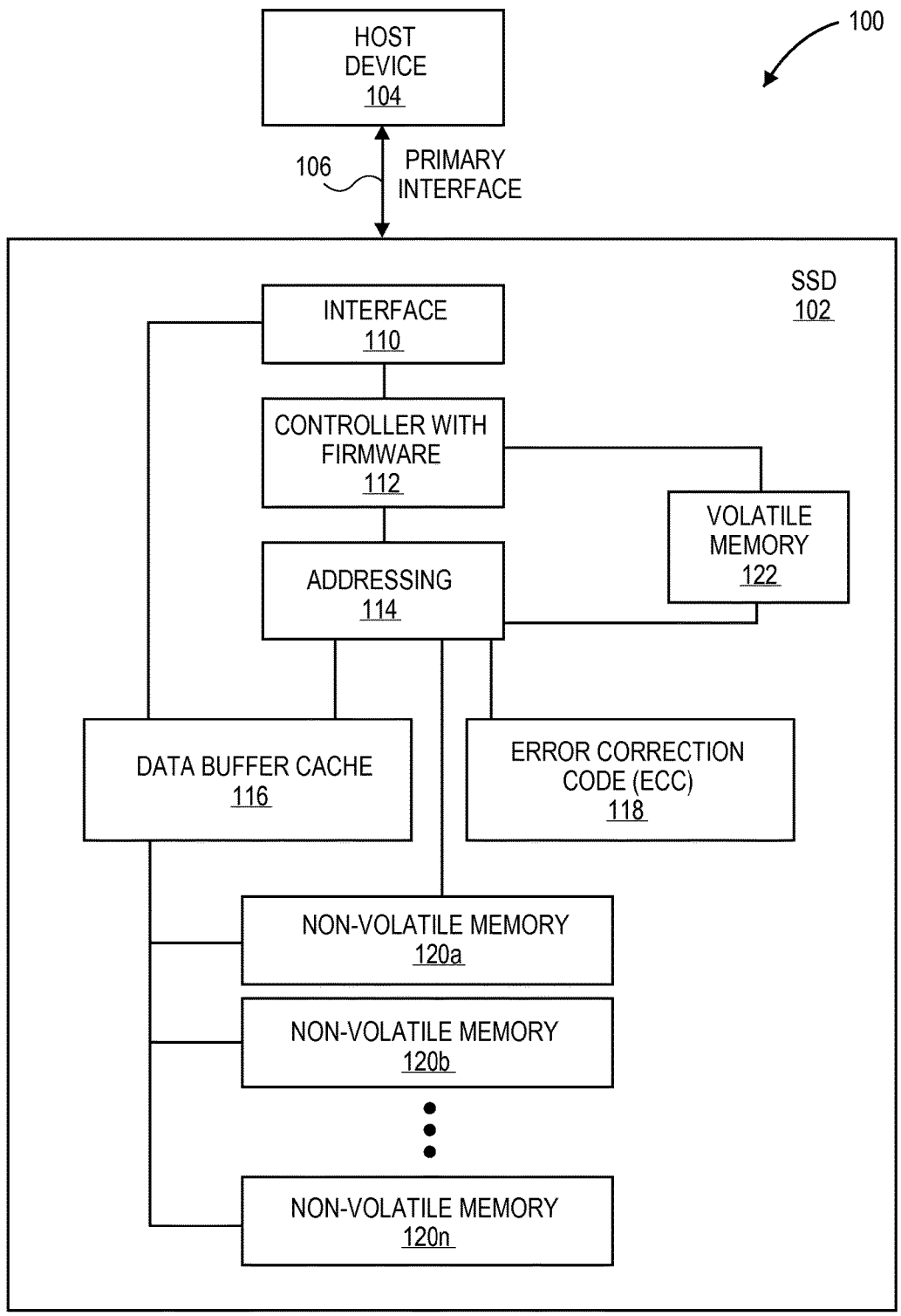
FIG. 1 is a block diagram illustrating an example operating environment in which embodiments of the invention may be implemented.

Embodiments of the invention may be used to manage a solid-state drive (SSD) storage device. FIG. 1 is a block diagram illustrating an example operating environment in which embodiments of the invention may be implemented. FIG. 1 illustrates a generic SSD architecture 100, with an SSD 102 communicatively coupled with a host device 104 through a primary communication interface 106. Embodiments of the invention are not limited to a configuration as depicted in FIG. 1, rather, embodiments may be applicable to operating environments other than SSDs, such as also in hard disk drives (HDDs), and may be implemented in SSD configurations other than that illustrated in FIG. 1. For example, embodiments may be implemented to operate in other environments which rely on volatile memory storage components for temporary storage of critical operational information.

Host device 104 (or simply "host") broadly represents any type of computing hardware or software that makes, among others, data I/O requests or calls to one or more memory device. For example, host 104 may be an operating system executing on a computer, a tablet, a mobile phone, or generally any type of computing device that contains or interacts with memory. The primary interface 106 coupling host device 104 to SSD 102 may be, for example, a computer's internal bus or a communication cable or a wireless communication link, or the like.

The example SSD 102 illustrated in FIG. 1 includes an interface 110, a controller 112 (e.g., a controller having firmware logic therein), an addressing 114 function block, data buffer cache 116, error correction code (ECC) 118, and one or more non-volatile memory components 120a, 120b, 120n. Any of the addressing 114 function block, data buffer cache 116, and ECC 118 may be integrated functionally as part of the controller 112, as in a System-On-Chip (SOC) configuration.

Interface 110 is a point of interaction between components, namely SSD 102 and host device 104 in this context, and is applicable at the level of both hardware and software. This allows a component to communicate with other components via an input/output system and an associated protocol. A hardware interface is typically described by the mechanical, electrical and logical signals at the interface and the protocol for sequencing them. Some non-limiting examples of common and standard interfaces include SCSI (Small Computer System Interface), SAS (Serial Attached SCSI), and SATA (Serial ATA).

An SSD 102 includes a controller 112, which incorporates the electronics that bridge the non-volatile memory components (e.g., NAND flash) to the host, such as non-volatile memory 120a, 120b, 120n to host device 104. The controller typically comprises an embedded processor that executes firmware-level code.

Controller 112 interfaces with non-volatile memory 120a, 120b, 120n via an addressing 114 function block. The addressing 114 function operates, for example, to manage mappings between logical block addresses (LBAs) from the host 104 to a corresponding physical block address on the SSD 102, namely, on the non-volatile memory 120a, 120b, 120n of SSD 102. Because the non-volatile memory page and the host sectors are different sizes, an SSD has to build and maintain a data structure that enables it to translate between the host writing data to or reading data from a sector, and the physical non-volatile memory page on which that data is actually placed. This table structure or "mapping" may be built and maintained for a session in the SSD's volatile memory 122, such as DRAM or some other local volatile memory component accessible to controller 112 and addressing 114.

Addressing 114 interacts with data buffer cache 116 and error correction code (ECC) 118, in addition to non-volatile memory 120a, 120b, 120n. Data buffer cache 116 of an SSD 102 may use, for non-limiting examples, SRAM or DRAM as a cache. Data buffer cache 116 serves as a buffer or staging area for the transmission of data to and from the non-volatile memory components, as well as serves as a cache for speeding up future requests for the cached data. Data buffer cache 116 is typically implemented with volatile memory so the data stored therein is not permanently stored in the cache, i.e., the data is not persistent.

ECC 118 is a system of adding redundant data, or parity data, to a message, such that it can be recovered by a receiver even when a number of errors were introduced, either during the process of transmission, or on storage.

Finally, SSD 102 includes one or more non-volatile memory 120a, 120b, 120n components. For a non-limiting example, the non-volatile memory components 120a, 120b, 120n may be implemented as flash memory (e.g., NAND or NOR flash), or other types of solid-state memory available now or in the future. The non-volatile memory 120a, 120b, 120n components are the actual memory electronic components on which data is persistently stored. The non-volatile memory 120a, 120b, 120n components of SSD 102 can be considered the analogue to the hard disks in hard-disk drive (HDD) storage devices.

In addition to a SSD storage device, embodiments of the invention may also be used to manage a hard disk drive (HDD) storage device. For example, a generic HDD architecture may comprise an HDD communicatively coupled with a host device through a primary communication interface, similar to the SSD configuration 100 illustrated in FIG. 1 in which SSD 102 is connected to host 104 through a primary communication interface 106. Further, an HDD comprises a controller with firmware communicatively coupled to volatile memory, similar to controller 112 and volatile memory 122 of SSD 102. The comparisons between HDD components and SSD components are meant to be conceptual rather than identical. Therefore, it is noted that HDD controllers are different from SSD controller 112, and are designed to perform some dissimilar as well as some similar functions. However, both HDDs and SSDs comprise a controller with some firmware embedded/encoded therein, which communicates with some form of volatile memory, such as DRAM.

Introduction

Embodiments of the invention are described relating to techniques for salvaging event trace information in a power loss interruption (PLI) scenario. Embodiments are applicable to, and may be implemented in and/or for, a solid-state drive (SSD) storage device as well as a hard disk drive (HDD) storage device. Consequently, use of these techniques enables obtaining a useable trace from a customer HDD or SDD drive with just a simple memory dump and avoiding the customer having to send in the drive to the factory for analysis. Salvaging event trace information is typically relevant and applicable to, for non-limiting examples, firmware development and drive validation and qualification testing.

A conventional code debugging process for embedded systems, generally, is to perform a memory dump, which is a snapshot of the state of internal system memory such as instruction memory, data memory, DRAM, and the like. Basically, the snapshot would provide the state of the system which a developer or debugger could use to try to understand a problem within the system. Such memory dumps are typically performed either periodically or in response to an interrupt event.

A relatively new class of issues that a firmware developer may need the firmware to support is a power loss interruption (PLI) event and a corresponding response and recovery. For example, support for a PLI event would typically need to handle "dirty write data" which has been write cached and already acknowledged to the host but not yet stored on the non-volatile media. Additionally, with SSDs there is the need to save the indirection data tables which map logical data addresses to physical memory locations. By nature, PLI events are temporally unexpected and, therefore, corresponding support for such events is a non-trivial and challenging process. Thus, the firmware may not always react optimally to a PLI event in the first instance.

Consequently, firmware tracing information is one of the more valuable debug tools for a developer. Event trace information is likened to a log, listing execution information associated with the previous hundreds or thousands of executed commands. Trace information may include, for example, identification of the last line of code executed, code variables, and the like, all of which are important pieces of information for a debugger. However, memory dumps typically give priority to firmware data structures and possibly to user data, but tracing information is treated as lower priority information to extract from the system upon a system failure. Therefore, tracing information may never be saved persistently because the short-term sustained charge available for processing when a system experiences a power failure may not even be enough to get to the tracing information.

As discussed, some shortcomings of convention memory dump processes are that the memory dumps are performed periodically, and that data structures and user data are given priority. Additionally, there are instances when system failures occur when one or more interrupt sequences are disabled and, consequently, no state data is saved persistently.

Dynamic Random-Access Memory (DRAM)

DRAM possesses some interesting inherent physical properties. Although considered volatile, DRAM is known to actually exhibit some characteristics of non-volatile memory over a relatively short period of time. That is, after power cycling a system, the internal DRAM can hold its state for some period of time without power, for example, possibly for 30 seconds up to a couple minutes. Some bits may be dropped or flipped but the data in DRAM is still relatively in tact for the period immediately after a power loss. Further, a controller memory manager may employ ECC protection on the DRAM (single bit correct, double bit detect) which can correct some errors in the data.

Method for Salvaging Event Trace Information

Based on the foregoing characteristic of DRAM, during a power up situation after a power down event, whereby the power up typically occurs within a few seconds of the power down, one can essentially look back in time at the DRAM state at the time of the power down and going back to the last DRAM refresh. If the DRAM state information that is salvaged after an inadvertent power loss were to include event trace information, then such information can provide a valuable debug resource. For example, such event trace information may be used to understand and debug how firmware is responding to particular events, namely failure events, such as a power loss interruption failure.

Figure 2:
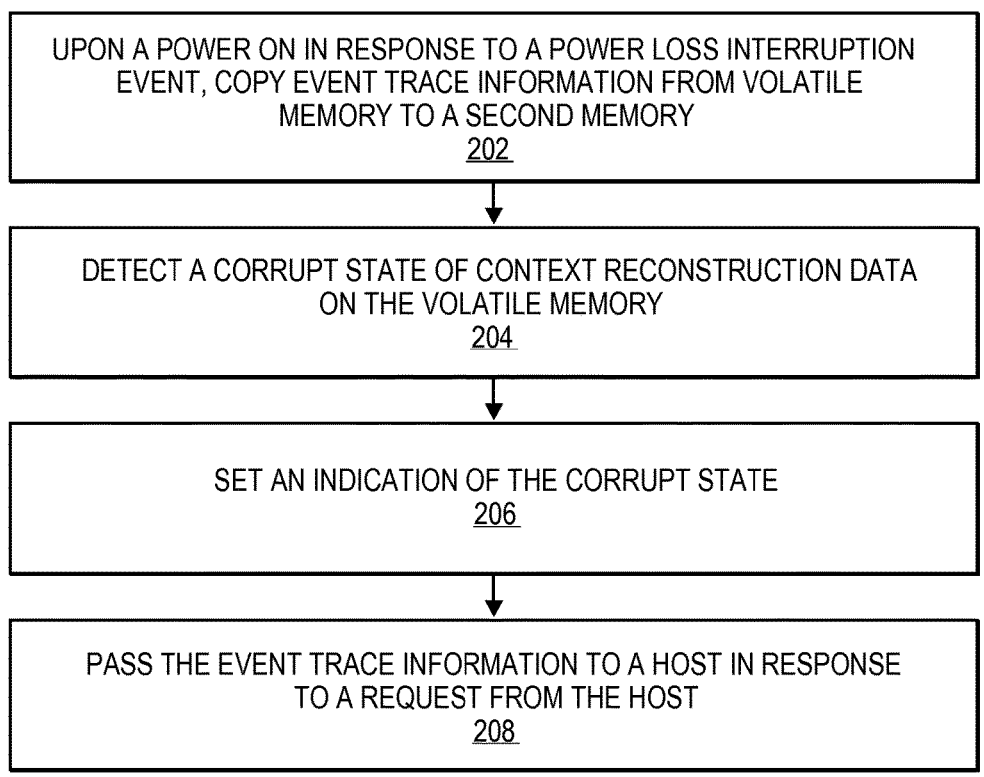
FIG. 2 is a flow diagram illustrating a method for salvaging event trace information in a power loss interruption (PLI) scenario, according to an embodiment of the invention.

FIG. 2 is a flow diagram illustrating a method for salvaging event trace information in a power loss interruption (PLI) scenario, according to an embodiment of the invention. The process illustrated in FIG. 2 may be implemented in an SSD such as SSD 102 (FIG. 1). More specifically, the process illustrated in FIG. 2 may be implemented in controller 112 (FIG. 1) of SSD 102, according to an embodiment. The process logic may be implemented as analog or digital hardware circuitry within SSD 102 or, preferably, as firmware instructions executed by a processor, such as CPU 204 (FIG. 2) or an MPU, within the SSD 102.

At block 202 of FIG. 2, event trace information from volatile memory is copied to a second memory. For example, event trace information is copied from volatile memory 122 (FIG. 1) to a dedicated portion of volatile memory 122 or to one or more non-volatile memory 120a, 120b, 120n (FIG. 1). The copying of event trace information from volatile memory to a second memory is performed upon a power on which, in an embodiment, is in response to a power loss interruption event. This is an optimum time to copy the event trace information to memory, before data is reset or overwritten upon the responsive power on cycle, and because the most current information will be recaptured, i.e., reflecting any processing that has occurred since the last periodic trace save. Further, this copying of event trace information is in conjunction with a "cold" reset, in which the power was actually off, rather than a "warm" reset, which is not in response to a power off scenario.

At block 204, a corrupt state of context reconstruction data stored on non-volatile memory is detected. Typically, upon a power on sequence the firmware will try to reconstruct its state based on what information is available on non-volatile, or persistent, media. This process is referred to herein as context reconstruction because the firmware is attempting to reconstruct the context, or state, in which it was executing at the time of the failure. Further, the firmware is configured to detect a corrupt state of data that it is programmed to use for reconstruction purposes. For non-limiting examples, the firmware may detect that it is unable to completely rebuild indirection (LBA) tables or that there is dirty write data that has not been written down to persistent memory, and the like.

At block 206, an indication of the corrupt state is set. For example, upon detecting a corrupt state of data the firmware may set a flag or a bit which indicates that a corrupt state is present. By setting this indication, the firmware is effectively notifying the host about the corrupt state, because the host is able to access and read the indication as set. For example, an program external to the storage device (e.g., a test or validation program) reads the flag and requests the event trace information, from the time of the PLI event, from the storage device to the host. Note that this is not a good time to save the event trace information to non-volatile memory because the saving process may actually change the current state of the information.

At block 208, the event trace information is passed to the host in response to a request from the host or an application program executing on the host, for example, in response to the corrupt state indication. This information can be passed to the host using the conventional storage device interface (e.g., SAS) or via a side-band debug interface.

Fault Tolerant Debug Tool

For a debug process, essentially any amount of legitimately formed trace information can be helpful in providing some degree of insight into the problem being analyzed. Thus, the more legitimately formed trace information that one has available, the better the problem analysis which can be performed.

According to an embodiment, the event trace information is passed to a fault tolerant debug tool which may execute on the host. The debug tool is a post-processing tool that parses and analyzes event trace data. Even though event trace information is usually well-formed, a robust debug tool should be tolerant of malformed event trace information and characters. Such a debug tool is fault tolerant, at least in part, in that the tool should continue its processing even when it encounters corrupt data, as well as make intelligent assumptions about malformed information to arrive at a "best guess" as to how the malformed information should be legitimately formed. Alternatively, and probably more typically, once the trace information is retrieved (usually by the customer drive qualification engineer) it is passed to the SSD development team and parsed offline.

According to an embodiment, the fault tolerant debug tool comprises an inference engine configured for inferring a legitimate trace character from a malformed trace character. This inference is based on the assumption or recognition that each bit representing the event trace information will normally decay from a "1" to a "0" as the system and constituent volatile memory is losing power due to the PLI event. The exact implementation of such fault tolerance into a debug tool will vary based on numerous factors, such as based on the implementation of the corresponding firmware, based on the formation of the corresponding event trace information, and based on the implementation of the debug tool itself, and the like.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   upon a powering on in response to a power loss interruption event in a storage device, copying event trace information from a first volatile memory to a second memory comprising a non-volatile memory or a dedicated portion of said first volatile memory, wherein said event trace information lists command execution information corresponding to executable code;
   while using particular data stored on said non-volatile memory to attempt to reconstruct the state in which said executable code was executing at the time of said power loss interruption event, detecting that said particular data is corrupt; and
   setting an indication that said particular data is corrupt.

2. The method of claim 1, further comprising:
   in response to a request from a host, passing said event trace information to said host.

3. The method of claim 1, wherein said first volatile memory is Dynamic Random-Access Memory (DRAM).

4. The method of claim 1, wherein said second memory is said dedicated portion of said first volatile memory.

5. The method of claim 1, wherein said second memory is non-volatile NAND flash memory.

6. The method of claim 1, further comprising:
   in response to a request from a host, passing said event trace information to said host, for use with a fault tolerant debug tool that comprises an inference engine configured for inferring a legitimate trace character from a malformed trace character.

7. The method of claim 1, further comprising:
   in response to a request from a host, passing said event trace information to a fault tolerant debug tool that executes on said host;
   wherein said fault tolerant debug tool comprises an inference engine configured for inferring a legitimate trace character from a malformed trace character.

8. The method of claim 7, wherein said inference engine is configured for inferring a legitimate trace character from a malformed trace character based on an assumption that each bit representing said event trace information will decay from a "1" to a "0" as said first volatile memory is losing power due to said power loss interruption event.

9. A solid-state drive controller storing one or more sequence of instructions which, when executed by one or more processors, causes performance of:
   copying event trace information from a first volatile memory to a second memory comprising a non-volatile memory or a dedicated portion of said first volatile memory upon a powering on in response to a power loss interruption event in a storage device, wherein said event trace information lists command execution information corresponding to executable code;
   while using particular data stored on said non-volatile memory to attempt to reconstruct the state in which said executable code was executing at the time of said power loss interruption event, detecting that said particular data is corrupt; and
   setting an indication that said particular data is corrupt.

10. The controller of claim 9, wherein said one or more sequences of instructions which, when executed by one or more processors, cause performance of:
   passing said event trace information to a host in response to a request from said host.

11. The controller of claim 9, wherein said first volatile memory is Dynamic Random-Access Memory (DRAM).

12. The controller of claim 9, wherein said one or more sequences of instructions which, when executed by one or more processors, cause performance of:
   in response to a request from a host, passing said event trace information to said host, for use with a fault tolerant debug tool that comprises an inference engine configured for inferring a legitimate trace character from a malformed trace character.

13. The controller of claim 9, wherein said one or more sequences of instructions which, when executed by one or more processors, cause performance of:
   in response to a request from a host, passing said event trace information to a fault tolerant debug tool that executes on said host;
   wherein said fault tolerant debug tool comprises an inference engine configured for inferring a legitimate trace character from a malformed trace character.

14. A storage device comprising:
   a communication interface for communicating with a host;
   one or more non-volatile media;
   a volatile memory; and
   a controller storing one or more sequences of instructions which, when executed by one or more processors, cause performance of:
      copying event trace information from said volatile memory to a second memory comprising a non-volatile memory or a dedicated portion of said volatile memory upon a powering on in response to a power loss interruption event in a storage device, wherein said event trace information lists command execution information corresponding to executable code;
      while using particular data stored on said non-volatile memory to attempt to reconstruct the state in which said executable code was executing at the time of said power loss interruption event, detecting that said particular data is corrupt; and
      setting an indication that said particular data is corrupt.

15. The storage device of claim 14, wherein said one or more sequences of instructions which, when executed by one or more processors, cause performance of:
   in response to a request from said host, passing said event trace information to said host.

16. The storage device of claim 14, wherein said volatile memory is Dynamic Random-Access Memory (DRAM).

17. The storage device of claim 14, wherein said second memory is said dedicated portion of said volatile memory.

18. The storage device of claim 14, wherein said second memory is non-volatile NAND flash memory.

19. The storage device of claim 14, wherein said one or more sequences of instructions which, when executed by one or more processors, cause performance of:
   in response to a request from said host, passing said event trace information to said host for use with a fault tolerant debug tool;
   wherein said fault tolerant debug tool comprises an inference engine configured for inferring a legitimate trace character from a malformed trace character.

20. The storage device of claim 19, wherein said inference engine is configured for inferring a legitimate trace character from a malformed trace character based on an assumption that each bit representing said event trace information will decay from a "1" to a "0" as said volatile memory is losing power due to said power loss interruption event.

* * * * *

UNITED STATES PATENT AND TRADEMARK OFFICE
CERTIFICATE OF CORRECTION

PATENT NO. : 9,690,642 B2
APPLICATION NO. : 13/719209
DATED : June 27, 2017
INVENTOR(S) : Anderson et al.

It is certified that error appears in the above-identified patent and that said Letters Patent is hereby corrected as shown below:

In the Claims

Column 8, beginning on Line 6, replace the text "sequence of instructions which, when executed by one or more processors, causes performance" with "sequences of instructions which, when executed by one or more processors, cause performance".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*